(12) United States Patent
Buenz et al.

(10) Patent No.: US 8,975,788 B2
(45) Date of Patent: Mar. 10, 2015

(54) POWER-FACTOR CORRECTION USING VOLTAGE-TO-CURRENT MATCHING

(75) Inventors: Mark J. Buenz, Prior Lake, MN (US); Greg Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 527 days.

(21) Appl. No.: 13/431,433

(22) Filed: Mar. 27, 2012

(65) Prior Publication Data

US 2013/0257391 A1 Oct. 3, 2013

(51) Int. Cl.
*H01H 9/54* (2006.01)

(52) U.S. Cl.
USPC .......................................................... 307/140

(58) Field of Classification Search
USPC .......................................................... 307/140
See application file for complete search history.

(56) References Cited

U.S. PATENT DOCUMENTS 7,880,334 B2 * 2/2011 Evans et al. ...................... 307/66

* cited by examiner

*Primary Examiner* — Robert L. Deberadinis
(74) *Attorney, Agent, or Firm* — Locke Lord LLP; Scott D. Wofsy; Joshua L. Jones (57) ABSTRACT

An example apparatus includes a power-factor correction (PFC) circuit coupleable to a primary load that exhibits a change in resistance with a change in applied voltage, with the respective voltage being a primary-load voltage, and current through the primary load being a primary-load current. The PFC circuit is configured to provide an auxiliary load and control current therethrough, with the respective current being an auxiliary-load current. In this regard, the PFC circuit is configured to control the auxiliary-load current such that the sum of the primary-load current and auxiliary-load current is a substantially-constant proportion of the primary-load voltage, the respective sum being a sum current.

15 Claims, 7 Drawing Sheets

POWER-FACTOR CORRECTION USING VOLTAGE-TO-CURRENT MATCHING

TECHNICAL FIELD

Example embodiments of the present invention generally relate to power-factor correction and, more particularly, relate to power-factor correction using voltage-to-current matching.

BACKGROUND

In aircraft, chip heaters may be used to provide anti-icing in vanes and pitot probes, and these chip heaters may exhibit changes in resistance with changes in applied voltage. When an AC voltage is applied, this effect may lead to a current draw that is not a constant proportion of the applied voltage. The frequency content of the voltage therefore may not match the frequency content of the current, which may lead to harmonic products in the current waveform that are not present in the supplied voltage. Aircraft manufacturers often specify the maximum amplitude of the current harmonics, based on the capabilities of the power generation devices on the particular aircraft, and the harmonics produced in chip heaters are often outside the normally required range. The closer the current is to an exact, constant proportion (multiple) of the voltage, the lower the harmonic products.

BRIEF SUMMARY

Example embodiments of the present invention provide an improved apparatus and method for power-factor correction using voltage-to-current matching. According to one example embodiment, an apparatus is provided that includes a power-factor correction (PFC) circuit coupleable to a primary load that exhibits a change in resistance with a change in applied voltage, with the respective voltage being a primary-load voltage, and current through the primary load being a primary-load current. In one example, the primary load includes a chip heater of an aircraft. In a further example, the PFC circuit may be thermally coupleable to a structure to which the chip heater is thermally coupled. In this further example, the PFC circuit may in operation generate heat that augments the chip heater in heating the respective structure.

The PFC circuit is configured to provide an auxiliary load and control current therethrough, with the respective current being an auxiliary-load current. In this regard, the PFC circuit may be configured to control the auxiliary-load current such that the sum of the primary-load current and auxiliary-load current is a substantially-constant proportion of the primary-load voltage, the respective sum being a sum current.

In one example, the PFC circuit being configured to control the auxiliary-load current includes being configured to generate a reference signal that controls the auxiliary load to add the auxiliary-load current to the primary-load current to produce the sum current having the same or substantially the same waveform as the primary-load voltage.

In one example, the PFC circuit includes a reference-signal subcircuit and an auxiliary-load subcircuit coupled to the reference-signal subcircuit. In this example, the reference-signal subcircuit may be configured to generate a reference signal having the same or substantially the same waveform as the primary-load voltage. And the auxiliary-load subcircuit may provide the auxiliary load and be configured to adjust the auxiliary-load current such that the reference signal and sum current are equal or substantially equal.

In one example, the reference-signal subcircuit may include a voltage-controlled gain amplifier to which the primary-load voltage is directly or indirectly suppliable, and the PFC circuit may further include a scale-control subcircuit coupled to the reference-signal subcircuit. The scale-control subcircuit may be configured to compare a peak amplitude of the primary-load current and amplitude of the reference signal. The scale-control subcircuit may then be configured to control a gain of the voltage-controlled gain amplifier based on the comparison, with the reference signal being produced at an output of the voltage-controlled gain amplifier. In one example, the scale-control subcircuit may be configured to control the gain such that a peak amplitude of the reference signal is equal or substantially equal to the peak amplitude of the primary-load current.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

Figure 1:
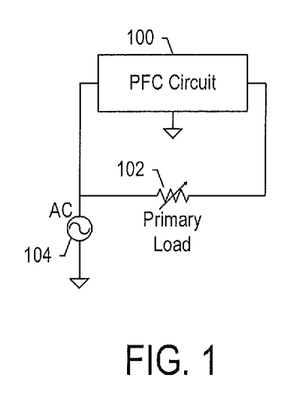
FIG. 1 illustrates a power-factor correction (PFC) circuit according to one example embodiment.

FIG. 1 illustrates a power-factor correction (PFC) circuit 100 according to one example embodiment. The PFC circuit is coupleable to a primary load 102 that exhibits a change in resistance with a change in applied voltage. In one example, the primary load includes a chip heater such as that used to provide anti-icing in vanes and pitot probes of aircraft. In one example, an alternating current (AC) voltage is applied to the primary load from an appropriate voltage source 104, which may lead to a current draw that is not a constant proportion of the applied voltage. That is, application of an AC voltage to the primary load may lead to a current through the primary load (i.e., "primary-load current") that is not a constant proportion of the voltage applied to the primary load (i.e., "primary-load voltage").

The PFC circuit 100 of example embodiments generally provides an auxiliary load and controls current through it such that the sum of the primary-load current and current through the auxiliary load (i.e., "auxiliary-load current") is a substantially-constant proportion of the primary-load voltage—the respective sum of currents at times referred to herein as a "sum current." For example, the PFC circuit may be configured to generate a reference signal (voltage) that controls the auxiliary load to add an auxiliary-load current to the primary-load current to produce a sum current having the same or substantially the same waveform as the primary-load voltage.

Figure 2:
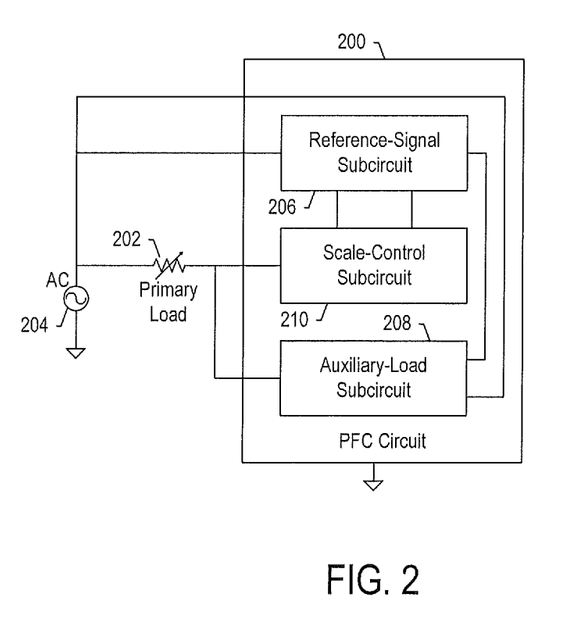
FIG. 2 illustrates one more-particular example of a suitable PFC circuit including a reference-signal subcircuit, auxiliary-load subcircuit and scale-control subcircuit, according to one example embodiment.

FIG. 2 illustrates one more-particular example of a suitable PFC circuit 200 coupleable to a primary load 202 to which a voltage source 204 applies an appropriate primary-load voltage. In one example, the PFC circuit, primary load and voltage source of FIG. 2 may correspond to PFC circuit 100, primary load 102 and voltage source 104 of FIG. 1. As shown, the PFC circuit may include a number of subcircuits such as a reference-signal subcircuit 206 and auxiliary-load subcircuit 208. The reference-signal subcircuit may be configured to generate the reference signal having the same or substantially the same waveform as the primary-load voltage, which in one example may be a sine wave.

In one example, the reference signal may be a version of the primary-load voltage scaled by the PFC circuit 200 to minimize the auxiliary-load current at the peak amplitude of the reference signal. In this regard, the reference-signal subcircuit 206 may include a voltage-controlled gain amplifier to which the primary-load voltage may be directly or indirectly suppliable. The PFC circuit may include a scale-control subcircuit 210 coupled to the reference-signal subcircuit and configured to compare the peak amplitude of the primary-load current and amplitude of the reference signal. The scale-control subcircuit may be configured to control the gain of the voltage-controlled gain amplifier based on the comparison; the reference signal being produced at an output of the gain amplifier. In one example, the scale-control subcircuit may be configured to control the gain such that that the peak amplitude of the reference signal is equal or substantially equal to the peak amplitude of the primary-load current. This may cause the auxiliary load to draw zero or near-zero current (auxiliary-load current) at the reference signal peak and minimize power dissipation of the PFC circuit.

The auxiliary-load subcircuit 208 may be coupled to the reference-signal subcircuit 206, and may provide the auxiliary load and be configured to control current through it (i.e., the auxiliary-load current) based on the reference signal. In one example, the auxiliary-load subcircuit may be configured to compare the reference signal to the sum current, and adjust the auxiliary-load current based on the comparison. For example, the auxiliary-load subcircuit may be configured to adjust the auxiliary-load current such that the reference signal and sum current are equal or substantially equal. In this regard, the auxiliary-load subcircuit may be configured to increase the auxiliary-load current in an instance in which the sum current is less than the reference signal. Conversely, the auxiliary-load subcircuit may be configured to decrease the auxiliary-load current in an instance in which the sum current is more than the reference signal. In accordance with example embodiments, the PFC circuit may not be dependent on the frequency or amplitude of the primary-load voltage waveform, and may be designed to cover a range of primary-load currents.

Figure 3:
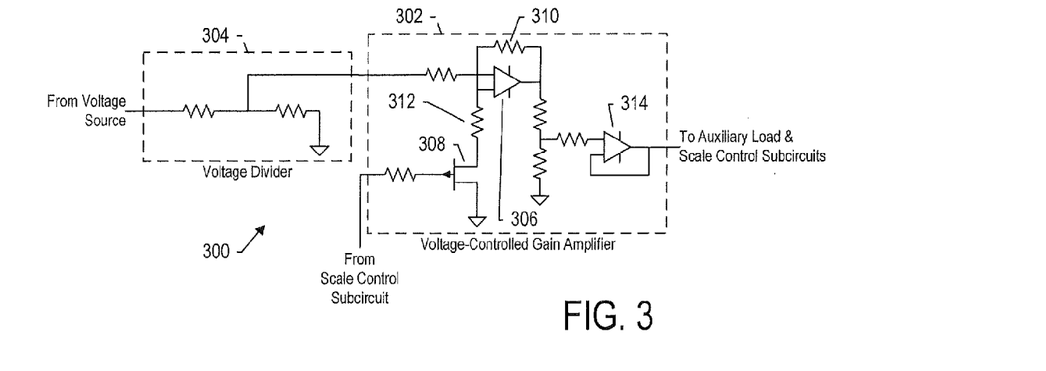
FIGS. 3, 4 and 5 illustrate more-particular examples of a suitable reference-signal subcircuit, auxiliary-load subcircuit and scale-control subcircuit, respectively, according to example embodiments.
Figure 4:
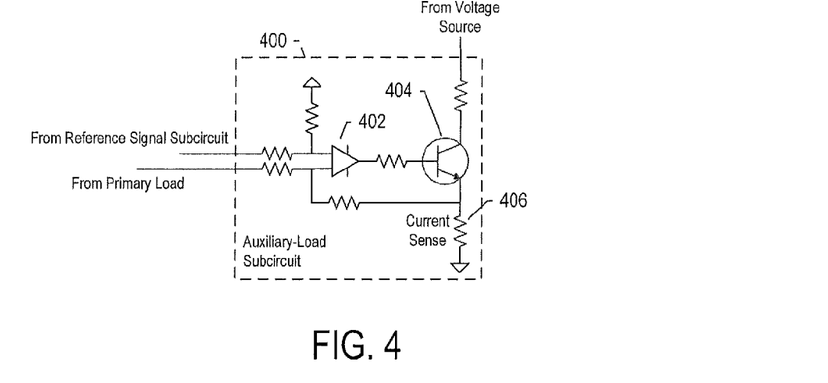
Figure 5:
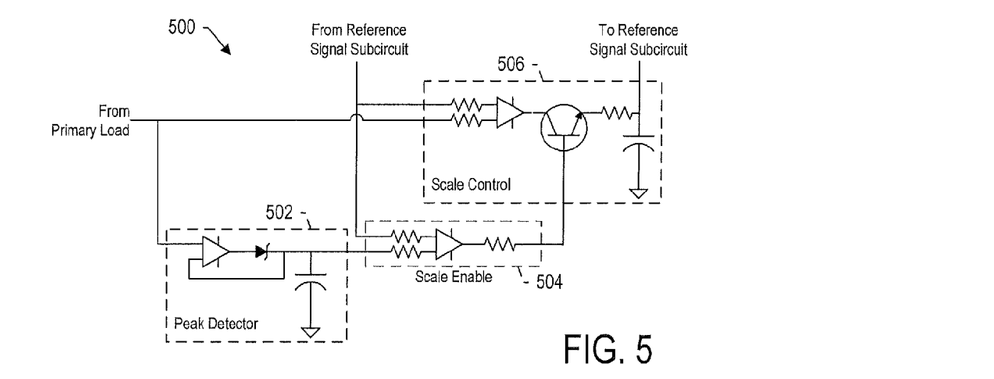

Reference will now be made to FIGS. 3, 4 and 5, which illustrate more-particular examples of a suitable reference-signal subcircuit, auxiliary-load subcircuit and scale-control subcircuit, respectively, according to example embodiments.

FIG. 3 illustrates one example of a suitable reference-signal subcircuit 300, which in one example may correspond to reference-signal subcircuit 206. As shown, the reference-signal subcircuit may include a voltage-controlled gain amplifier 302, and may further include a voltage divider 304. As indicated above, the voltage-controlled gain amplifier may be generally configured to generate the reference signal that has the same or substantially the same waveform as the primary-load voltage. In one example, the primary-load voltage from the voltage source may be substantially higher than the primary-load current. The voltage divider may therefore be any of a number of different circuits configured to produce an output voltage that is a fraction of the primary-load voltage, such as to at or below the minimum amplitude of the primary-load current. As shown, the voltage divider includes a pair of resistors in series, but other voltage divider circuits (e.g., potentiometer) may be employed.

The voltage-controlled gain amplifier 302 may be coupleable to the voltage source to receive the primary-load voltage. In another example, the voltage-controlled gain amplifier may be coupled to the voltage divider 304 to receive its output voltage (fraction of the primary-load voltage). The voltage-controlled gain amplifier may therefore be configured to generate the reference signal from the primary-load voltage or fraction thereof. In one example, the voltage-controlled gain amplifier is configured to scale the output voltage from the voltage divider. In various examples, the primary-load current can very over a particular range (e.g., 20 to 1 in ratio of maximum to minimum primary-load current), with in one example, the primary-load current decreasing as the temperature of the primary load increases. The reference signal for the auxiliary-load current to reduce (if not eliminate) harmonics may be scaled accordingly. If a constant reference signal is used, the PFC circuit may produce excess current in an instance in which the primary load warms up or no harmonics reduction at high current levels.

The voltage-controlled gain amplifier 302 may include an amplifier 306 having a non-inverting operational amplifier topology, and as a result the circuit may have a minimum gain of one. As shown, the voltage-controlled gain amplifier may include a field effect transistor (FET) 308 to provide a variable resistance. In one example, the FET may be a P-type FET. In one example, the ratio of the feedback resistor 310 (to the non-inverting operational amplifier) to the FET effective resistance controls the gain. The gain equation may be represented as $V_{out}=V_{in}(R_{fet}+R_{fb})/R_{fet}$. In the preceding, $R_{fet}$ may represent the equivalent resistance of the FET, and $R_{fb}$ may represent the fixed feedback resistor. In one example, the value $R_{fet}$ includes the value of the resistor 312 between the FET and feedback resistor. This resistor may set the maximum gain (the gain when $R_{fet}$ goes to 0 ohms).

In one example, the scale-control subcircuit may be configured to control the gain of the voltage-controlled gain amplifier 302, such as by application of a control voltage to the FET. In this regard, as the control voltage is increased, the FET's effective resistance may increase, which may decrease the gain. The reference signal (voltage) generated by the voltage-controlled gain amplifier 302 may set the lower current limit of the auxiliary-load subcircuit. More particularly, for example, the size of the voltage divider 304 output may set the lower current limit, and the gain and headroom of the voltage-controlled gain amplifier may set the maximum current value. The auxiliary-load subcircuit ideally does not add any current at the peak of the reference signal. A reference signal that is larger than the minimum current may add unnecessary current at the peak, but may not affect the harmonic performance.

In one example, some distortion may occur in the voltage-controlled gain amplifier 302. This distortion may be worse at low gain settings. To mitigate this effect, voltage-controlled gain amplifier may include a unity-gain amplifier 314 configured to divide down and buffer the output of the voltage-controlled gain portion of the circuit, thereby producing the reference signal.

FIG. 4 illustrates one example of a suitable auxiliary-load subcircuit 400, which in one example may correspond to auxiliary-load subcircuit 208. As shown, the auxiliary-load subcircuit may include a difference amplifier 402 coupled to a power transistor 404. The difference amplifier may be configured to control the auxiliary-load current using the reference signal as one input, and the sum current (sum of primary-load current and auxiliary-load current) as the other input. The difference amplifier may be configured to drive the transistor such that the reference signal and sum current are equal or substantially equal. Written notationally, the voltage generated by the operational amplifier $V_{Control}$ may be represented as follows:

$$V_{Control} \times \beta = I_{Auxiliary} \text{ such that } V_{Reference} = (V_{IPrimary} + V_{IAuxiliary})$$

In the preceding, $\beta$ represents the current gain of the transistor, $I_{Auxiliary}$ represents the emitter current (auxiliary-load current), $V_{Reference}$ represents the reference signal, $V_{IPrimary}$ represents a voltage corresponding to the primary-load current, and $V_{IAuxiliary}$ represents a voltage corresponding to the auxiliary-load current)—a voltage corresponding to the sum current being represented by ($V_{IPrimary} + V_{IAuxiliary}$). In one example, the PFC circuit may include a current sense resistor or other means for providing a measurement of the primary-load current. Similarly, the auxiliary-load subcircuit of one example may include a current sense resistor 406 or other means for providing a measurement of the auxiliary-load current. In one example, the current sense resistors may also provide measurements of voltages corresponding to the primary-load and auxiliary-load currents, such as in the case of 1 ohm current sense resistors.

FIG. 5 illustrates one example of a suitable scale-control subcircuit 500, which in one example may correspond to scale-control subcircuit 210. As shown, the scale-control subcircuit may include a peak detector 502, scale-enable circuit 504 and scale-control circuit 506 coupled to one another. As explained above, the auxiliary-load current may be controlled around the peak amplitude of the reference signal. Again, in one example, the gain control of the reference-signal subcircuit may be designed such that that the peak amplitude of the reference signal is equal or substantially equal to the peak primary-load current (which in one example may be represented as a voltage on a 1 ohm current sense resistor), which may result in a zero or near-zero auxiliary-load current at the peak reference signal. In one example, then, the gain of the voltage-controlled gain amplifier of the reference-signal subcircuit may be controlled around the reference signal peak.

The peak detector 502 may be configured to input the primary-load current and detect its peak amplitude level, which the peak detector may latch at its output. The primary-load current peak may be provided to the scale-enable circuit 504, which may compare it to the reference signal and generate a control signal to the scale-control circuit 506 based on the comparison. The scale-control circuit may be enabled by the control signal to cause adjustment of the reference signal. In one example, the scale-control circuit enabled by the control signal may be configured to generate a scaling voltage, which the scaling-control circuit may provide to the reference-signal subcircuit to adjust the gain of its voltage-controlled gain amplifier (or scaling of the primary-load voltage). In one example, then, the scale-enable circuit may be configured to compare the primary-load current peak to a slightly-reduced reference signal generated in one example by a voltage divider (not shown), and generate a control signal, which may adjust the scaling voltage to the voltage-controlled gain amplifier.

In the scale-control circuit 506, the primary-load current may be compared to the reference signal, and at the reference signal peak (the scale enable period), may increase or decrease the scaling voltage based on the comparison. For example, the scale-control circuit may decrease the scaling voltage in an instance in which the primary-load current is greater than the reference signal during the scale enable period, which may in turn cause the reference-signal subcircuit to increase the amplitude of the reference signal. Conversely, for example, the scale-control circuit may increase the scaling voltage in an instance in which the primary-load current is less than the reference signal during the scale enable period, which may cause the reference-signal subcircuit to decrease the amplitude of the reference signal. In one example, the scaling voltage may be gated by the control signal from the scale-enable circuit 504 so that the scaling voltage applied to the scaled sine generator may be updated when the reference signal is at or near its peak amplitude.

In one example in which the voltage source supplies AC voltage, the scale-enable circuit 504 may be configured to generate a square wave control signal (amplitude equal to the supply voltage). It may be in phase with the AC voltage, but be a pulse centered on peak of the AC voltage. The pulse width may be adjusted by how much the reference signal is 'slightly reduced.' When the reference signal is too small to trigger the control signal, the scaling voltage from the scale-control circuit 506 may bleed to a lower voltage and the gain of the voltage-controlled gain amplifier may increase. Conversely, when the reference signal is greater than necessary, the control signal may pass through, which may in turn increase the scaling voltage and lower the gain.

Figure 6:
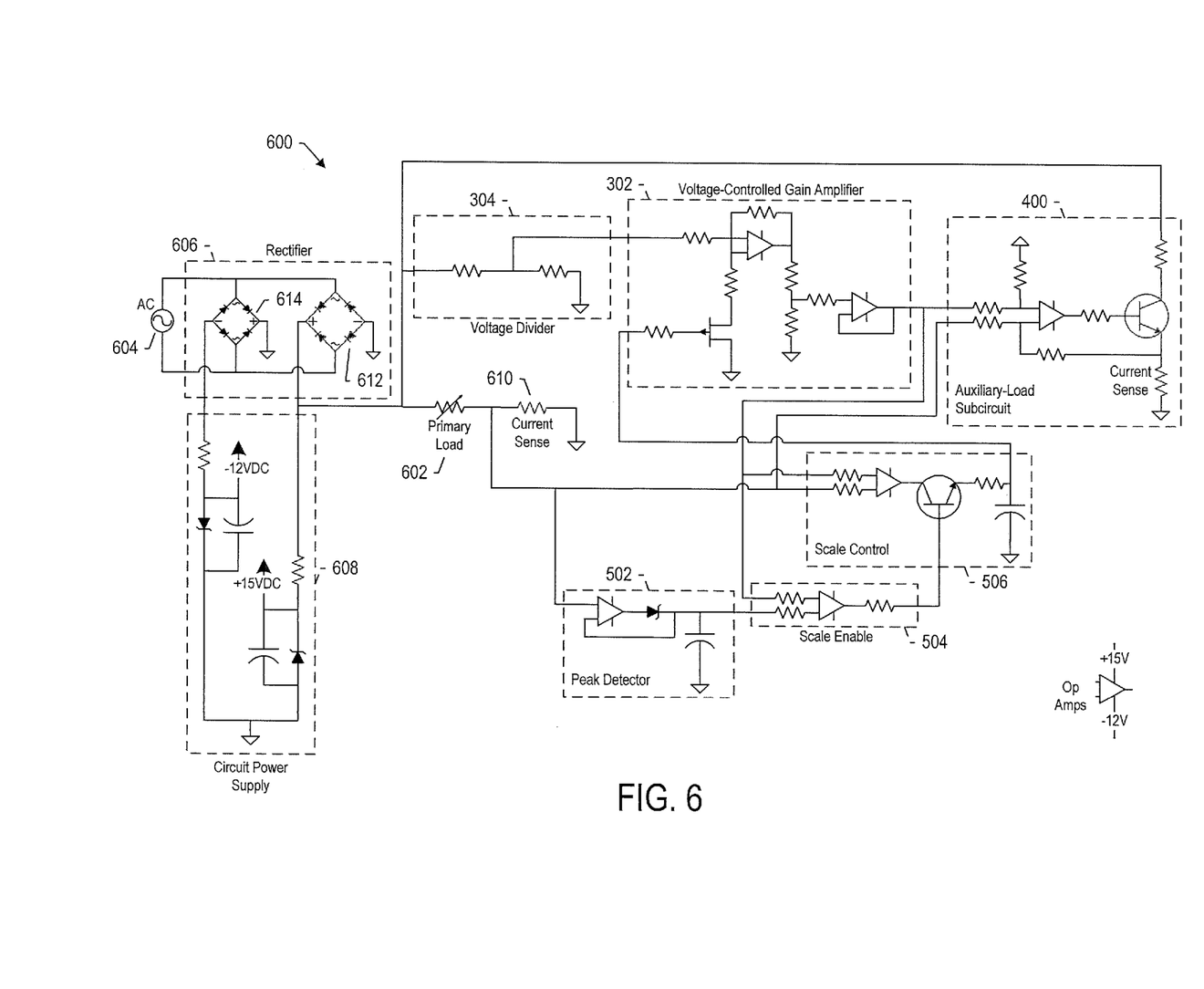
FIG. 6 illustrates a PFC circuit including the reference-signal subcircuit, auxiliary-load subcircuit and scale-control subcircuit of respective ones of FIGS. 3, 4 and 5, according to one example embodiment.

Reference is now made to FIG. 6 which illustrates a PFC circuit 600 including reference-signal subcircuit 300, auxiliary-load subcircuit 400 and scale-control subcircuit 500 according to one example. As shown, the PFC circuit may be coupleable to a primary load 602 to which a voltage source 604 applies an appropriate primary-load voltage. In one example, the PFC circuit, primary load and voltage source of FIG. 6 may correspond to PFC circuit 200, primary load 202 and voltage source 204 of FIG. 2. In the PFC circuit of FIG. 6, the reference-signal subcircuit, auxiliary-load subcircuit and scale-control subcircuit may be constructed and configured to operate in respective manners similar to those explained above.

In addition to the reference-signal subcircuit 300, auxiliary-load subcircuit 400 and scale-control subcircuit 500, the PFC circuit 600 of FIG. 6 may also include a rectifier circuit 606 and circuit power supply 608, and may further include a current sense resistor 610 or other means for providing a measurement of the primary-load current. In one example, the rectifier circuit may include a full-wave rectifier 612 configured to rectify the AC voltage from the voltage source 604. This may allow a virtual ground to reference the PFC circuit's subcircuits, and simplify the circuit by eliminating components otherwise required to correct current for the negative part of the cycle. This rectified voltage then may be applied to the primary load 602 and reference-signal subcircuit (or rather, in one example, its voltage divider 304).

As shown, the rectifier circuit 606 may also include a smaller, second full-wave rectifier 614 configured to similarly rectify the AC voltage from the voltage source 604, but produce a negative rectified voltage (full-wave rectifier 612 producing a positive rectified voltage). As explained herein, a number of subcircuits of the PFC circuit 600 include operational amplifiers and other components requiring a power supply. The positive and negative rectified voltages may therefore be applied to the circuit power supply 608 through respective diode/capacitor pairs to generate positive and negative voltages used to power a number of the circuit components including the operational amplifiers. In one example, the positive rectified voltage may be passed through a 15-volt zener diode/capacitor pair to generate a positive 15 volts direct current (DC). The negative rectified voltage may be passed through a 12-volt zener diode/capacitor pair to generate a negative 12 volts DC, which may allow at least the operational amplifiers to operate more accurately around the virtual ground reference. As shown, each diode/capacitor pair may include a dropping resistor between the diode and rectified voltage supply. In one example, this dropping resistor may be sized to appropriately reduce the rectified voltage to near the intended supply voltage at the intended supply current and dissipate the power generated from reducing the voltage. In one example, the sizing depends on the requirements on the +15/−12 volts DC. For example, if each operational amplifier draws a nominal 10 mA (+15) and there are five operational amplifiers in the PFC circuit, 50 mA may be required. If the rectified voltage is 163 volts, the dropping resistor must be less than (163−15)/0.05 or 2960 ohms. At 50 mA, this resistor may dissipate 7.4 W. The power supply load may also be dependent on the current requirements of the selected operational amplifiers for the PFC circuit 600. And the capacitors may be sized to prevent excess voltage droop during the low voltage portions of the rectified input.

Figure 7:
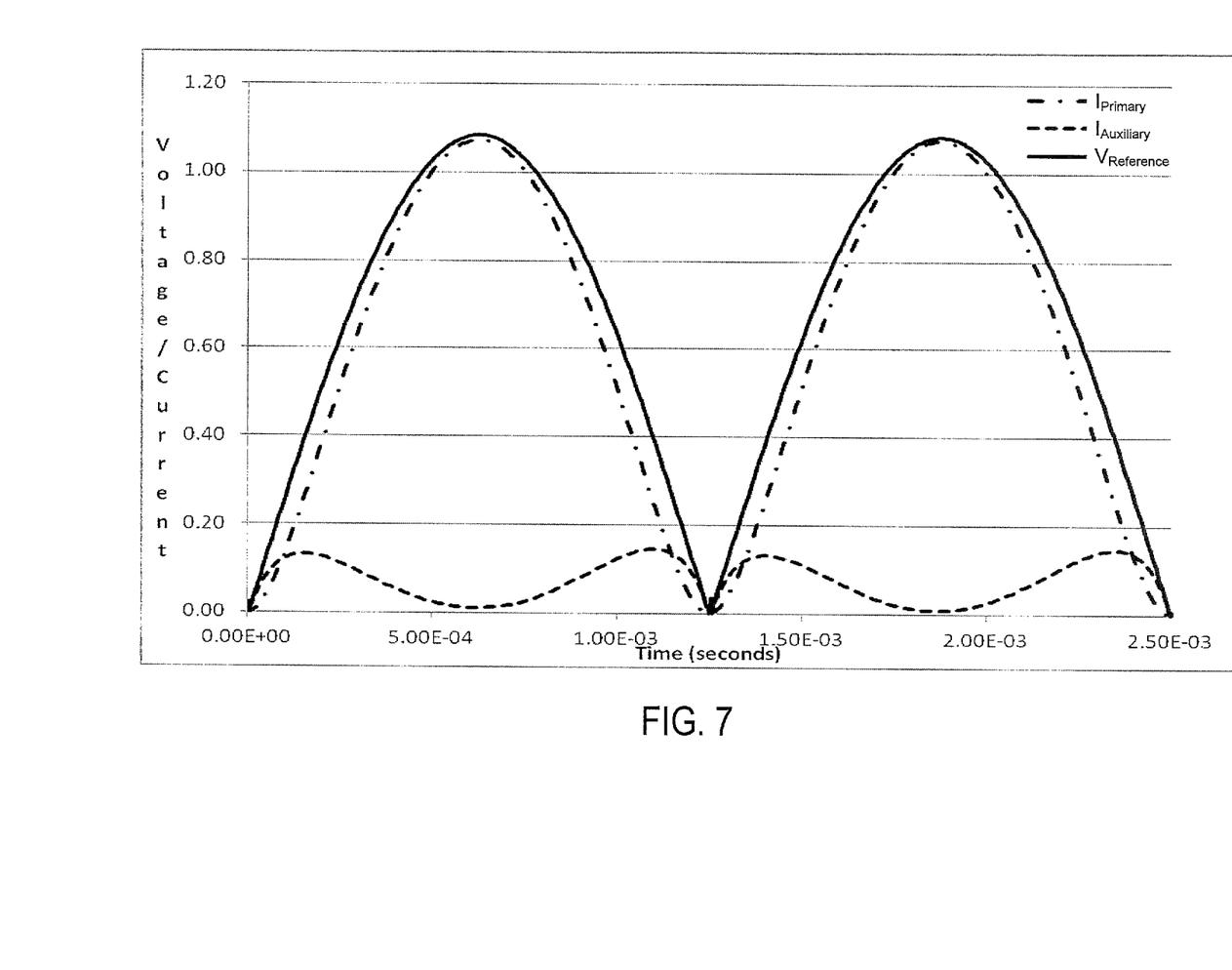
FIGS. 7, 8 and 9 illustrate graphs of a primary-load current, auxiliary-load current and reference signal, according to example embodiments.
Figure 8:
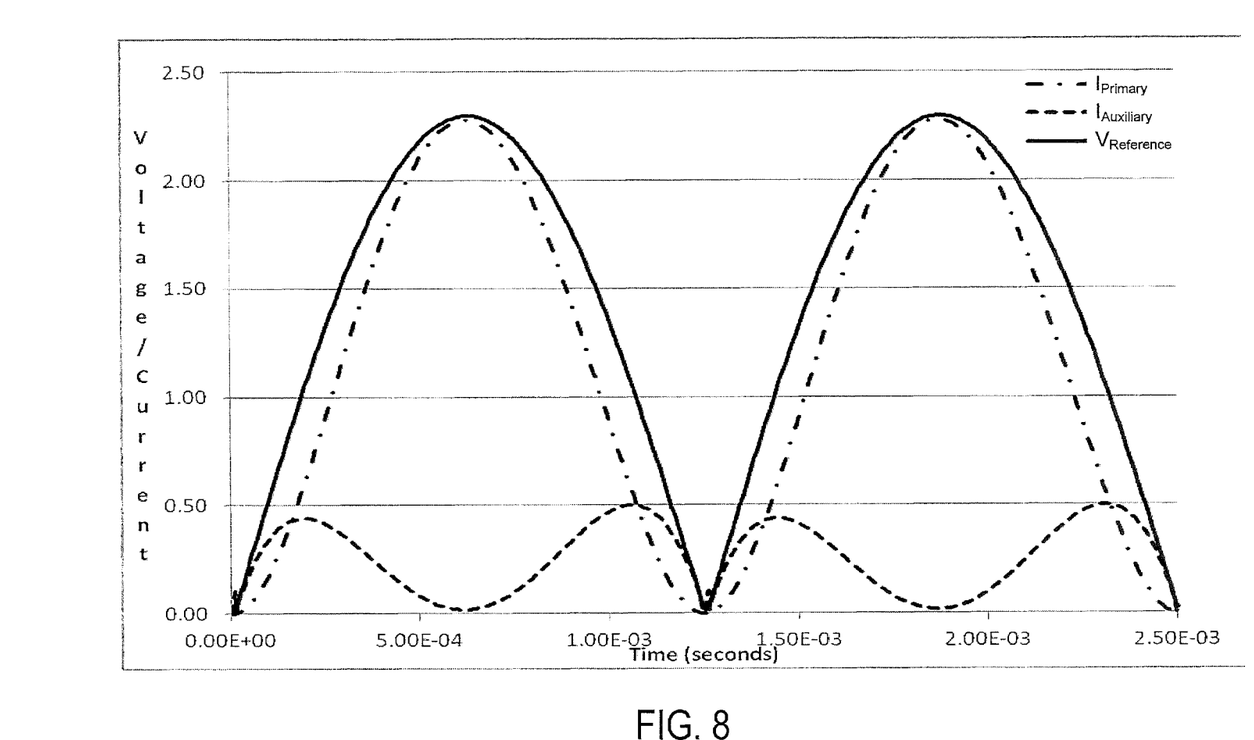
Figure 9:
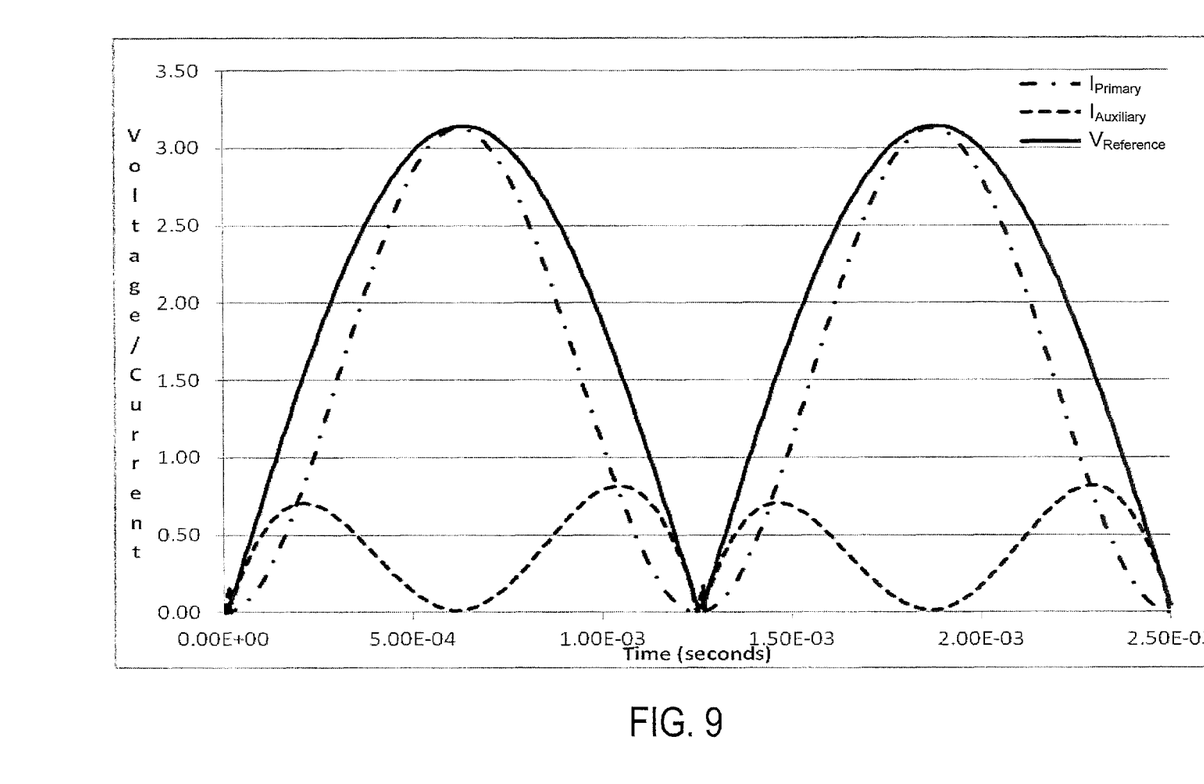

FIGS. 7, 8 and 9 illustrate graphs of the primary-load current ($I_{Primary}$), auxiliary-load current ($I_{Auxiliary}$) and reference signal ($V_{Reference}$) for 1.2 amp, 2.5 amp and 3.5 amp primary-load current peaks. The reference signal may be a reference to show the non-sinusoidal waveform of the primary-load current. As shown, the primary-load current peak is equal or substantially equal to the reference signal peak, and auxiliary-load current is zero or near zero at the reference signal peak. Although not separately shown, in one example, the sum current ($I_{Primary}+I_{Auxiliary}$) may be equal or substantially equal the reference signal.

Figure 10:
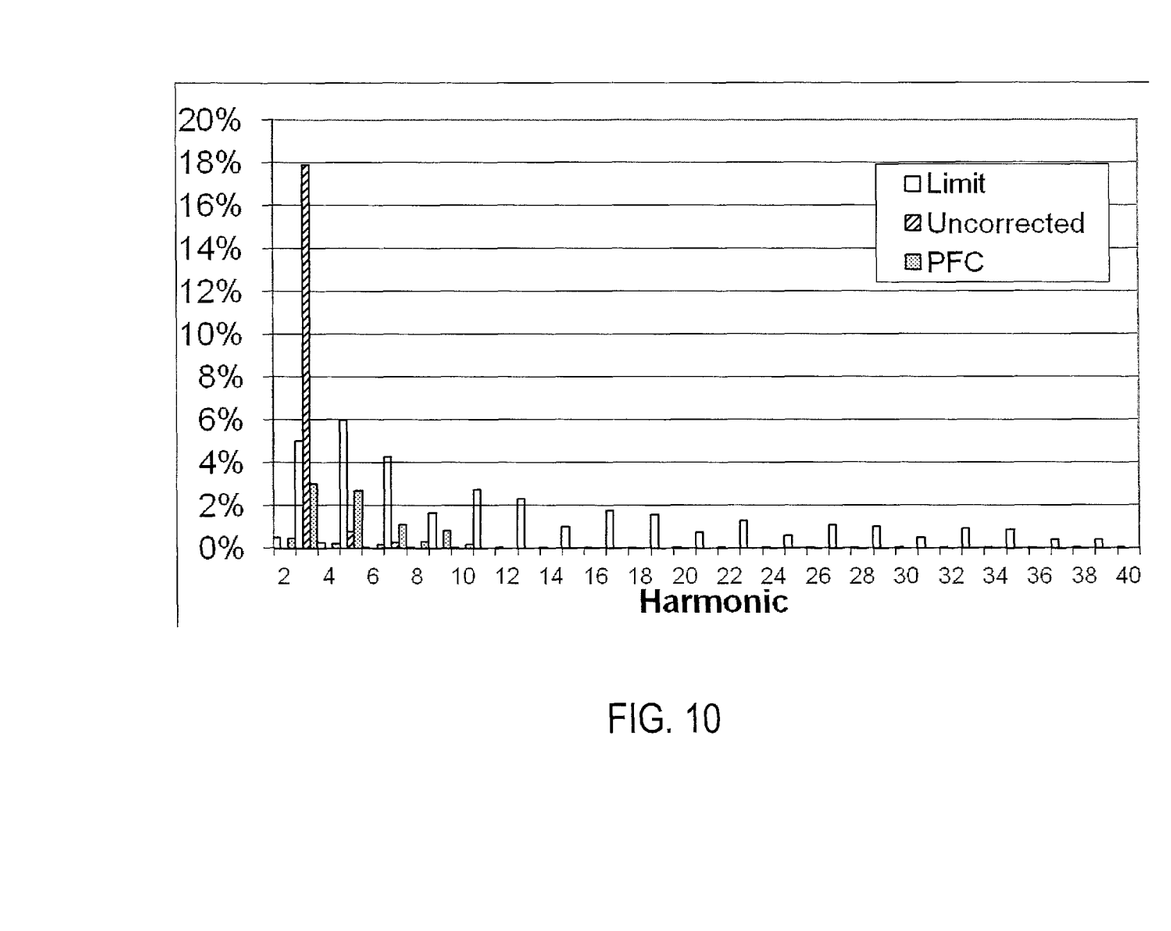
FIG. 10 illustrates a chart showing power-factor measurements illustrating the results of coupling the PFC circuit of example embodiments to a primary load in the form of a chip heater.

FIG. 10 illustrates a chart showing power-factor measurements illustrating the results of coupling the PFC circuit of example embodiments to a primary load in the form of a chip heater. Each column represents the percent harmonic at each harmonic multiple of the reference frequency (in this case, 400 Hz) starting with the second harmonic. The uncorrected data points refer to an example heater used as a reference. And the limit data refers to a typical aircraft-manufacturer specification for the maximum amplitude of current harmonics, which again may be based on the capabilities of the power generation devices on a particular aircraft.

The PFC circuit may generate an amount of heat that may be useful in various contexts, such as in an instance in which the primary load is in the form of a chip heater. In one example, the PFC circuit may be thermally coupleable to a structure to which a chip heater is thermally coupled, such as a vane or pitot probe of an aircraft. The PFC circuit in operation may generate heat, which may augment the chip heater in providing anti-icing or otherwise heating of the respective structure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
    a power-factor correction (PFC) circuit coupleable to a primary load that exhibits a change in resistance with a change in applied voltage, the respective voltage being a primary-load voltage, and current through the primary load being a primary-load current,
    wherein the PFC circuit is configured to provide an auxiliary load and control current therethrough, the respective current being an auxiliary-load current, the PFC circuit being configured to control the auxiliary-load current such that the sum of the primary-load current and auxiliary-load current is a substantially-constant proportion of the primary-load voltage, the respective sum being a sum current.

2. The apparatus of claim 1, wherein the PFC circuit being configured to control the auxiliary-load current includes being configured to generate a reference signal that controls the auxiliary load to add the auxiliary-load current to the primary-load current to produce the sum current having the same or substantially the same waveform as the primary-load voltage.

3. The apparatus of claim 1, wherein the PFC circuit comprises:
    a reference-signal subcircuit configured to generate a reference signal having the same or substantially the same waveform as the primary-load voltage; and
    an auxiliary-load subcircuit coupled to the reference-signal subcircuit, the auxiliary-load subcircuit providing the auxiliary load and being configured to adjust the auxiliary-load current such that the reference signal and sum current are equal or substantially equal.

4. The apparatus of claim 3, wherein the reference-signal subcircuit includes a voltage-controlled gain amplifier to which the primary-load voltage is directly or indirectly suppliable, and the PFC circuit further comprises:
    a scale-control subcircuit coupled to the reference-signal subcircuit and configured to compare a peak amplitude of the primary-load current and amplitude of the reference signal, the scale-control subcircuit being configured to control a gain of the voltage-controlled gain amplifier based on the comparison, the reference signal being produced at an output of the voltage-controlled gain amplifier.

5. The apparatus of claim 4, wherein the scale-control subcircuit is configured to control the gain such that a peak amplitude of the reference signal is equal or substantially equal to the peak amplitude of the primary-load current.

6. The apparatus of claim 1, wherein the PFC circuit is coupleable to the primary load comprising a chip heater of an aircraft.

7. The apparatus of claim 6, wherein the PFC circuit is thermally coupleable to a structure to which the chip heater is thermally coupled, the PFC circuit in operation generating heat that augments the chip heater in heating the respective structure.

8. An apparatus coupleable to a primary load that exhibits a change in resistance with a change in applied voltage, the respective voltage being a primary-load voltage, and current through the primary load being a primary-load current, the apparatus comprising:
- a reference-signal subcircuit configured to generate a reference signal having the same or substantially the same waveform as the primary-load voltage; and
- an auxiliary-load subcircuit coupled to the reference-signal subcircuit and configured to provide an auxiliary load and control current therethrough, the respective current being an auxiliary-load current, the auxiliary-load subcircuit being configured to adjust the auxiliary-load current such that the reference signal is equal or substantially equal the sum of the primary-load current and auxiliary-load current, the respective sum being a sum current.

9. The apparatus of claim 8, wherein the reference-signal subcircuit comprises a voltage-controlled gain amplifier configured to generate the reference signal from the primary-load voltage or a fraction thereof.

10. The apparatus of claim 9, wherein the reference-signal subcircuit further comprises a voltage divider coupled to the voltage-controlled gain amplifier and configured to produce a voltage that is a fraction of the primary-load voltage, the voltage-controlled gain amplifier being configured to generate the reference signal from the voltage produced by the voltage divider.

11. The apparatus of claim 9 further comprising:
- a scale-control subcircuit coupled to the reference-signal subcircuit and configured to compare a peak amplitude of the primary-load current and amplitude of the reference signal, the scale-control subcircuit being configured to control a gain of the voltage-controlled gain amplifier based on the comparison.

12. The apparatus of claim 11, wherein the scale-control subcircuit comprises:
- a scale-enable circuit configured to compare the peak amplitude of the primary-load current and amplitude of the reference signal, and generate a control signal based on the comparison; and
- a scale-control circuit coupled to the scale-enable circuit and configured to receive the control signal, the scale-control circuit being configured to compare the primary-load current and reference signal, and enabled by the control signal to generate a scaling voltage based on the respective comparison,
- wherein the scale-control circuit is configured to provide the scaling voltage to the reference-signal subcircuit to adjust the gain of the voltage-controlled gain amplifier.

13. The apparatus of claim 8, wherein the auxiliary-load subcircuit comprises a difference amplifier coupled to a power transistor, wherein the difference amplifier is configured to input the reference signal and sum current, and drive the transistor such that the reference signal and sum current are equal or substantially equal.

14. The apparatus of claim 8, wherein the apparatus is coupleable to the primary load comprising a chip heater of an aircraft.

15. The apparatus of claim 14, wherein the apparatus is thermally coupleable to a structure to which the chip heater is thermally coupled, the apparatus in operation generating heat that augments the chip heater in heating the respective structure.

* * * * *